(12) United States Patent  (10) Patent No.: US 7,596,396 B2
Fagrenius et al.  (45) Date of Patent: Sep. 29, 2009

(54) FLEXIBLE GASKETS FOR WIRELESS TERMINALS WITH SLIDING MEMBERS

(75) Inventors: Nils Gustav Fagrenius, Dalby (SE); Sven Rune Fredrik Palmqvist, Staffanstorp (SE); Johan Martin Wedel, Kävlinge (SE); Carl Magnus Waldt, Kävlinge (SE); Eva Tina Rålin, Malmö (SE); Sten Ola Håkansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 532 days.

(21) Appl. No.: 11/552,160

(22) Filed: Oct. 24, 2006

(65) Prior Publication Data
US 2007/0275774 A1 Nov. 29, 2007

Related U.S. Application Data

(60) Provisional application No. 60/803,262.

(51) Int. Cl.
*H04M 1/00* (2006.01)
(52) U.S. Cl. .................. 455/575.4; 455/575.1
(58) Field of Classification Search .............. 455/575.1, 455/575.8, 575, 3, 575.4
See application file for complete search history.

(56) References Cited

U.S. PATENT DOCUMENTS 7,142,898 B2 * 11/2006 Takagi ..................... 455/575.3

FOREIGN PATENT DOCUMENTS

| EP | 0696864 | 2/1996 |
| EP | 1499093 | 1/2005 |
| JP | 2006157465 | 6/2006 |

OTHER PUBLICATIONS

International Search Report and Written Opinion dated Mar. 15, 2007 for corresponding PCT application No. PCT/EP2006/068345.

* cited by examiner

*Primary Examiner*—Tu X Nguyen
(74) *Attorney, Agent, or Firm*—Myers, Bigel, Sibley & Sajovec, P.A.

(57) ABSTRACT

Gaskets and wireless terminals with gaskets for sealing a space between sliding members in wireless terminals. The wireless terminals include: (a) a first member; (b) a second member overlying the first member, wherein at least one of the first and second members is configured to slide between open and closed configurations; and (c) a gasket attached to the first and second members, the gasket having an elongate body portion with opposing first and second end portions affixed to a respective one of the first and second members. The gasket is configured to provide an electrical path between at least one component in the first member to at least one component in the second member. The elongate body portion is configured to snugly abut the first and second members to inhibit dust from entering a target interior space when the wireless terminal is in the open configuration.

20 Claims, 7 Drawing Sheets

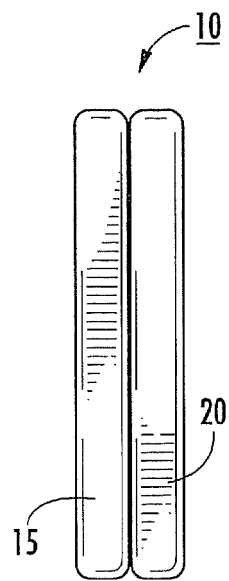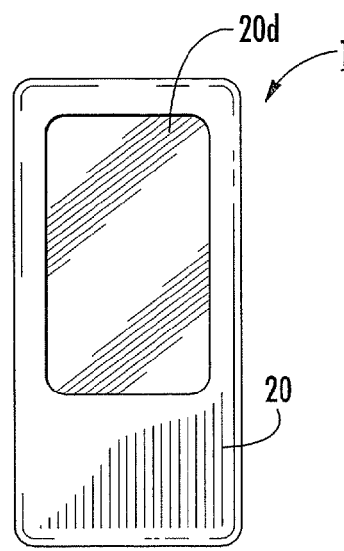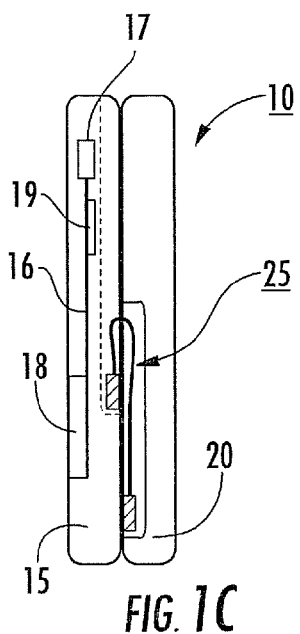
FIG. 1B   FIG. 1A   FIG. 1C
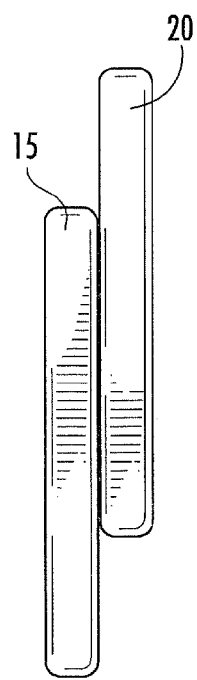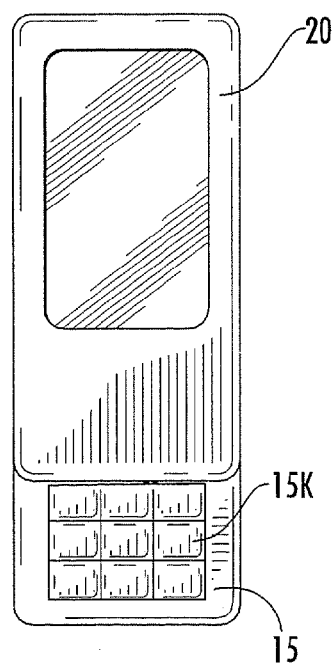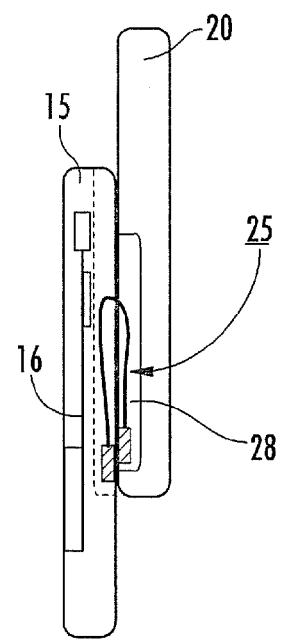
FIG. 2B   FIG. 2A   FIG. 2C

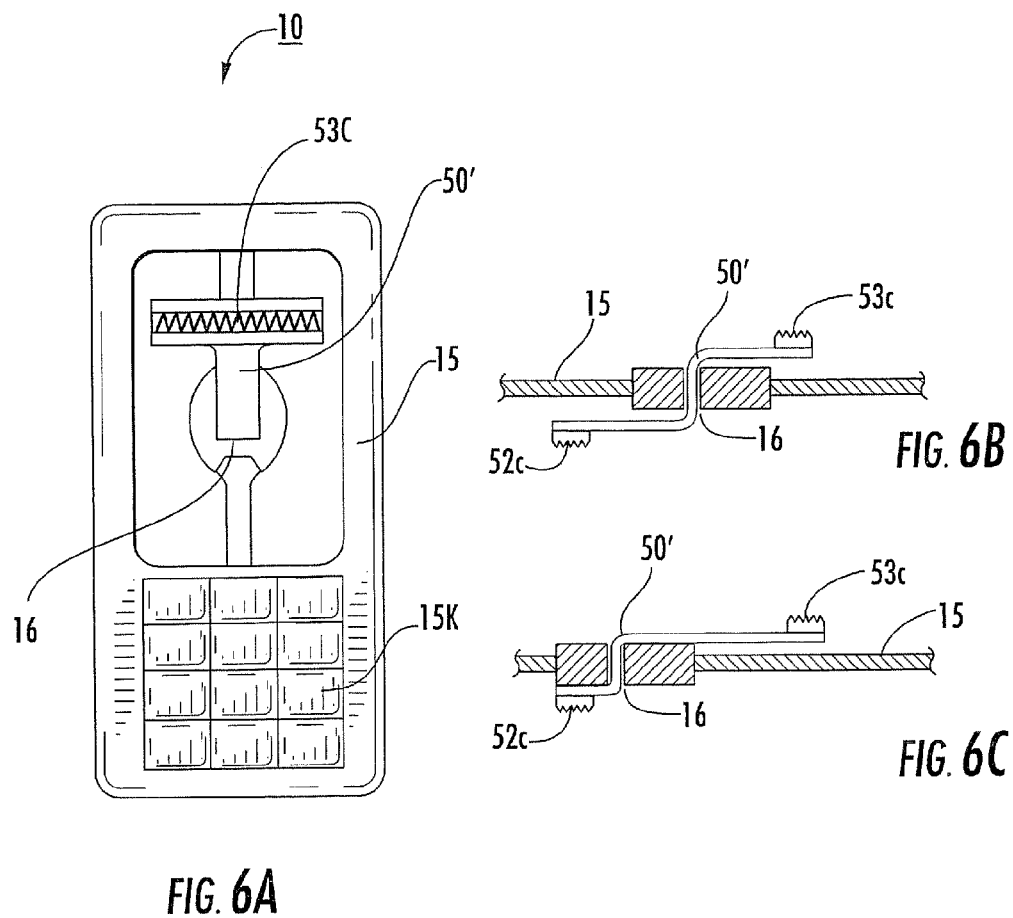
FIG. 6A
FIG. 6B
FIG. 6C
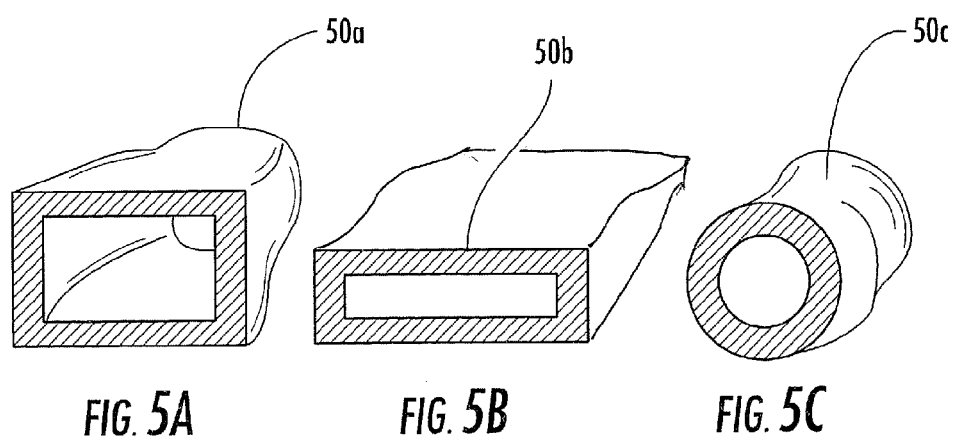
FIG. 5A
FIG. 5B
FIG. 5C

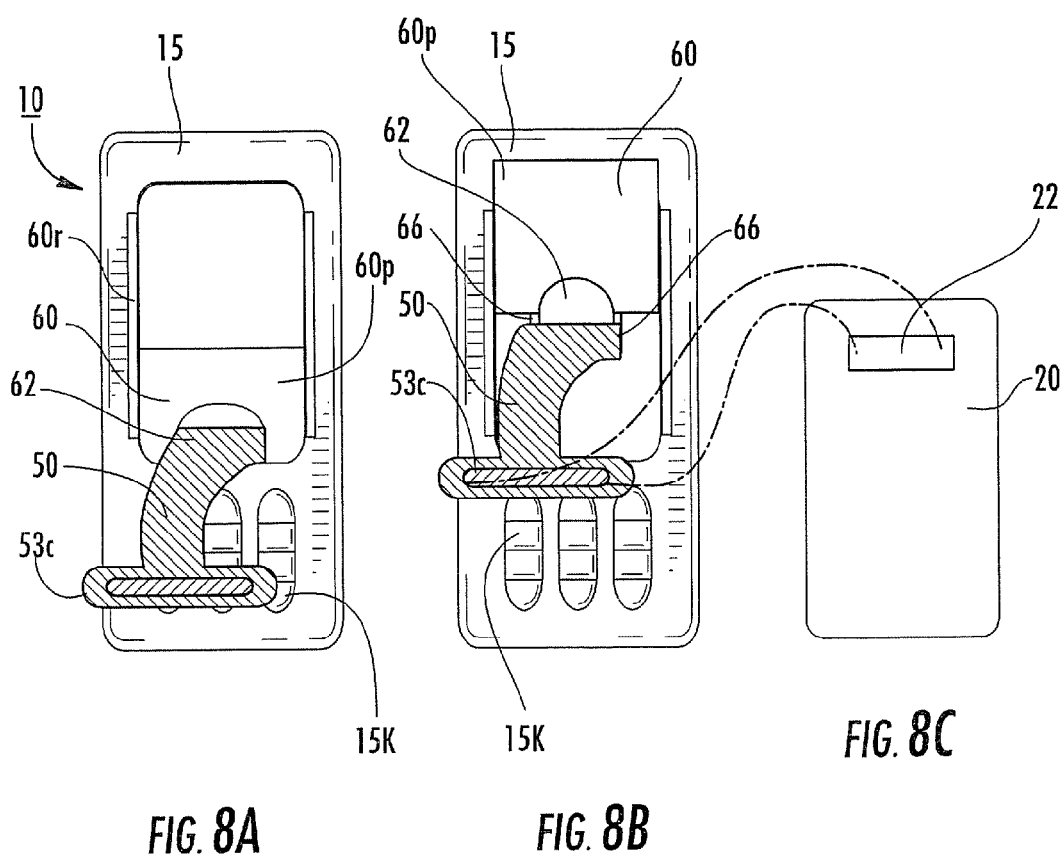

FLEXIBLE GASKETS FOR WIRELESS TERMINALS WITH SLIDING MEMBERS

RELATED APPLICATIONS

This application claims priority to U.S. Provisional Application Ser. No. 60/803,262, filed May 26, 2006, the contents of which are hereby incorporated by reference as if recited in full herein.

FIELD OF THE INVENTION

The present invention relates to the field of communications, and, more particularly, to wireless terminals incorporating the same.

BACKGROUND OF THE INVENTION

Wireless terminals, such as wireless mobile telephones can include sliding members. Unfortunately, the translation can allow environmental debris, such as dust, to enter into internal portions of the telephone, which may degrade performance over time.

SUMMARY OF THE INVENTION

Embodiments of the present invention provide gaskets that can attach to members that translate to seal interior portions of the device and/or inhibit environmental debris from entering regions holding sensitive operating components in the device. The gaskets can hold or include electrical paths that can allow components in different housing members to be in electrical communication.

Some embodiments of the invention are directed to wireless terminals. The wireless terminals include: (a) a first member; (b) a second member overlying the first member, wherein at least one of the first and second members is configured to slide between open and closed configurations; and (c) a gasket attached to the first and second members, the gasket having an elongate body portion with opposing first and second end portions affixed to a respective one of the first and second members. The gasket is configured to provide an electrical path between at least one component in the first member to at least one component in the second member. The elongate body portion is configured to snugly abut the first and second members to inhibit dust from entering a target interior space when the wireless terminal is in the open configuration.

In some embodiments, the gasket can have a curvilinear side profile shape in the open and closed configurations. The curvilinear profile can have first and second axially extending leg portions on opposing sides of a fold region with the fold region residing at a forwardmost location of the gasket in a opening sliding direction of the second housing member. The first leg portion is closer to the first housing member than the second leg portion and the second leg portion is closer to the second housing member than the first leg portion. The second leg portion is longer than the first leg portion in the open position. Optionally, the first and second leg portions can have a length that is substantially the same in the closed configuration.

The gasket can include a flexible non-conductive substrate with a flexible circuit thereon or therein. The gasket can include an elastically stretchable substrate. The gasket can be tubular and compressible.

In some embodiments, the first member has a keypad and a power source in communication with a transceiver that transmits and receives wireless communications signals. The second member has a display overlying and slidably attached to the first member. The second member is configured to slide between open and closed configurations. In the closed configuration the first and second members are configured so that the second member substantially covers the keypad on the first member. In the open configuration the second member resides above and axially above a top portion of the first member to reveal the keypad on the first member.

The wireless terminal product can include a wireless mobile telephone.

The gasket can have first and second opposing end portions, with the first end portion statically affixed to the first member and the second end portion is statically affixed to the second member.

The gasket can be configured to matably releasably lock against walls of a channel in the first member. The gasket can include a sliding lock or zipper attachment mechanism.

The wireless terminal can include a sliding plate mounted to the first member, the plate having a contoured perimeter portion for closing against a perimeter shape of the gasket. In some embodiments, the gasket is attached to the sliding plate and is pulled back and forth in response to movement of the sliding plate.

The gasket may have first and second electrical connection end portions with the second electrical connection end portion configured to engage a laterally extending channel formed through a rear surface of the second member.

Some embodiments are directed to flexible elongate gaskets for a wireless terminal. The gaskets have electrical connections on spaced apart opposing first and second end portions, and the gasket defines an electrical path therebetween. The flexible elongate gasket is configured to reside in abutting contact against first and second members, at least one of which is slidable relative to the other. The gasket is sized and configured to occupy a target gap space between the first and second members to form a seal that inhibits dust from entering the gap space.

The gasket may be substantially tubular. The gasket may have a first folded configuration in the open configuration and a second folded configuration different from the first configuration in the closed configuration.

The gasket can be configured to matably releasably lock against a rigid member.

The gasket can have a sliding lock or zipper attachment mechanism.

Some embodiments are directed to methods for inhibiting dust from entering a housing compartment in a mobile telephone with a sliding member. The methods include: (a) sliding a second member over a second member to open a mobile telephone; (b) automatically translating a gasket defining an electrical path between a battery in the first member to a display in the second member in response to the sliding step; and (c) inhibiting dust from entering the mobile telephone in response to the translating step.

The method may also optionally include: affixing a first end portion of the gasket to the first member and a second opposing end portion of the gasket to the second member so that the first and second end portions are held securely and statically in position; and threading a portion of the gasket through an aperture in the second member whereby the gasket substantially seals the opening and serial portions of the gasket travel through the opening to translate axially during the translating step.

These and other embodiments will be described further below.

BRIEF DESCRIPTION OF THE DRAWINGS

FIG. 1A is a top view of a wireless terminal device illustrating the device in a closed configuration according to embodiments of the present invention.

FIG. 1B is a side view of the wireless terminal shown in FIG. 1A.

FIG. 1C is a partial cutaway side view of the device shown in FIG. 1A.

FIG. 2A is a top view of the wireless terminal device shown in FIG. 1A, with the device in an open configuration according to embodiments of the present invention.

FIG. 2B is a side view of the opened device shown in FIG. 2A.

FIG. 2C is a partial cutaway side view of the opened device shown in FIG. 2A.

FIGS. 5A-5C are partial end perspective views of exemplary configurations of gaskets that fit target gap spaces according to embodiments of the present invention.

FIG. 6A is a top view of a lower portion of a wireless terminal with a gasket that can translate in response to translation of a sliding member according to embodiments of the present invention.

FIGS. 6B and 6C are side schematic views of the gasket configuration shown in FIG. 6A.

FIG. 8A is a schematic illustration of the device shown in FIG. 7A with a gasket in position in a closed configuration of the sliding mechanism according to embodiments of the present invention.

FIG. 8B is a schematic illustration of the device shown in FIG. 7B with the gasket shown in FIG. 8A in position in an open configuration of the sliding mechanism according to embodiments of the present invention.

FIG. 8C is a schematic top view of the upper sliding member with an aperture configured to attach to the loose gasket end portion shown in FIG. 8B according to some embodiments of the invention.

DETAILED DESCRIPTION OF EMBODIMENTS OF THE INVENTION

Figure 3A:
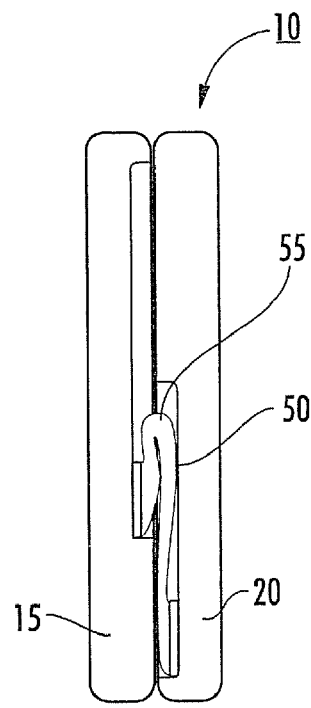
FIG. 3A is a partial cutaway side view of a wireless terminal with a gasket that includes at least one electrical path or lead between first and second members according to embodiments of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be appreciated that although discussed with respect to a certain embodiment, features or operation of one embodiment can apply to others.

Like numbers refer to like elements throughout. In the figures, the thickness of certain lines, layers, components, elements or features and/or regions may be exaggerated for clarity. Broken lines illustrate optional features or operations unless specified otherwise. Features described with respect to one embodiment can also apply to another embodiment.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "gasket" refers to a member that defines a seal that inhibits dust from entering an interior compartment or region. The gasket can be flexible and resiliently deformable to repetitively compress between two housing members, then return to a pre-compressed shape based on the opening and closing of the wireless terminal. The gasket can be impermeable to fluids such as air, or may be breathable but configured to filter out dust or particulate debris. The gasket material may be elastically stretchable, at least for a length commensurate with the sliding stroke length. The gasket can be configured to exhaust heat and moisture while inhibiting dust or moisture from entering the device. The gasket can be moisture resistant. The gasket may be formed from an elastomeric material, such as a polymeric material. The gasket can be formed from material similar to 3M™ medical products such as, but not limited to, Tegaderm™, Medipore™, Micropore™, Transpore™, Durapore™ and other air permeable barrier materials. These materials are barriers that help prevent external contaminants from entering a target site while letting oxygen in and moisture vapor out.

Embodiments of the present invention will be described in detail below with reference to the figures. Although primarily described with respect to the wireless terminal being a mobile telephone, the invention may be suitable for other wireless terminal devices. As used herein, the term "wireless terminal" may include, but is not limited to, portable radio communication equipment such as a mobile radio terminal, including cellular wireless terminals or mobile telephones with or without a multi-line display; a Personal Communications System (PCS) terminal that may combine a cellular wireless terminal with data processing, facsimile and data communications capabilities; a PDA that can include a wireless terminal internet/intranet access, web browser, pager, organizer, calendar and/or a GPS receiver; pagers; organizers; smart phones; and a conventional laptop and/or palmtop receiver or other appliance that includes a wireless terminal transceiver. Wireless terminals may also be referred to as "pervasive computing" devices and may be mobile terminals. The wireless terminal devices may operate at a single or multiple frequency bands.

Examples of operating systems that may be incorporated into a wireless terminal include, a Global System for Mobile communication (GSM), which is a digital mobile telephone system that typically operates at a low frequency band, such as between 880 MHz and 960 MHz; a Digital Communications System (DCS), which is a digital mobile telephone system that typically operates at high frequency bands, such as between 1710 MHz and 1880 MHz. In addition, the wireless terminals may include global positioning systems (GPS) or Bluetooth systems use frequencies of 1.575 or 2.4-2.48 GHz. The wireless terminal may employ frequency bands allocated for mobile terminals in North America, such as, for example, 824-894 MHz for Advanced Mobile Phone Service (AMPS) and 1850-1990 MHz for Personal Communication Services (PCS). The wireless terminals can include these and/or other frequency bands for use in other jurisdictions.

In certain embodiments, the wireless terminals may be configured with antennas that provide resonance for a global positioning system (GPS), and can include a GPS receiver. GPS operates at approximately 1.575 GHz. GPS is well known to those skilled in the art. GPS is a space-based triangulation system using satellites and computers to measure positions anywhere on the earth. Compared to other land-based systems, GPS is less limited in its coverage, typically provides continuous twenty-four hour coverage regardless of weather conditions, and is highly accurate. In the current implementation, a constellation of twenty-four satellites that orbit the earth continually emit the GPS radio frequency. The additional resonance of the antenna as described above permits the antenna to be used to receive these GPS signals.

Conventional wireless terminals typically employ an antenna that is electrically connected to a transceiver operatively associated with a signal processing circuit positioned on an internally disposed printed circuit board. In order to increase the power transfer between an antenna and a transceiver, the transceiver and the antenna may be interconnected such that their respective impedances are substantially "matched," i.e., electrically tuned to compensate for undesired antenna impedance components, to provide a 50-Ohm (Ω) (or desired) impedance value at the feed point.

Referring to FIGS. 1A-1C and 2A-2C, the wireless terminal 10 includes a first member 15 and a second member 20, with a flex circuit 25 extending therebetween. The wireless communication device 10 shown in the figures may be a radiotelephone type radio terminal of the cellular or PCS type. The first member 15 can include a keypad 15$k$ and the second member 20 can include a display 20$d$. The first member 15 can include a circuit board 16 with operating components, a radio-frequency (RF) transceiver 17, and a power source 18 (i.e., a battery). The flex circuit 25 provides an electrical communication path to supply power and transport data from the first member 15 to the second member 20. As shown in FIGS. 1C and 2C, when the second member 20 moves between the open and close positions, the flex circuit 25 allows or causes a gap 28 that can allow dust to get into the interior of the second member 20 of the wireless terminal 10.

The transceiver 17 can be electrically connected to a controller 19 such as a microprocessor (digital signal processor) held on the circuit board 16. The controller 19 can be electrically connected to a speaker (not shown) that is configured to transmit a signal from the controller 19 to a user of a wireless terminal. The controller can also electrically connected to a microphone that receives a voice signal from a user and transmits the voice signal through the controller and transceiver to a remote device. The controller can be electrically connected to the keypad 15$k$ and display 20$d$ that facilitate wireless terminal operation. Operation of a wireless terminal and the transceiver, controller, speaker and microphone are well known to those of skill in the art and need not be described further herein.

Figure 3B:
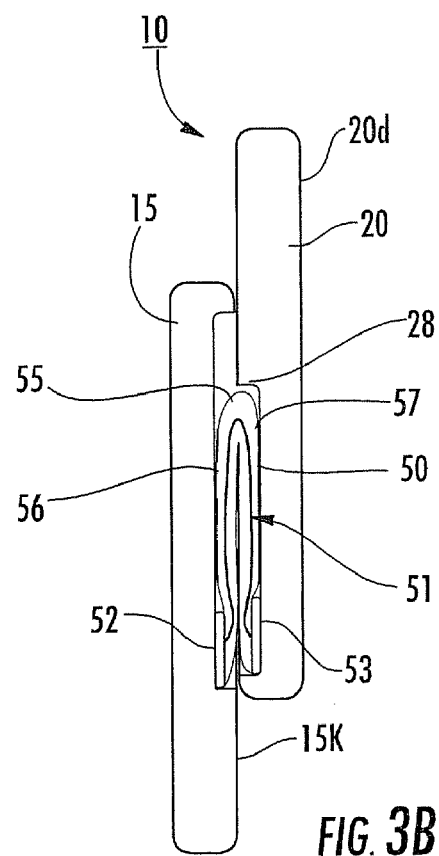
FIG. 3B is a partial cutaway side view of the wireless terminal shown in FIG. 3A, with the device in an opened configuration and the gasket compressed relative to the closed configuration according to some embodiments of the present invention.

As shown in FIGS. 3A and 3B, the gasket 50 is flexible and elastically deformable and compressible. FIG. 3A illustrates the gasket 50 trapped between the first and second members 15, 20 when the wireless terminal 10 is closed. FIG. 3B illustrates the gasket 50 when the wireless terminal 10 is open, with the gasket 50 folded over itself and snugly abutting both the first and second members 15, 20, respectively, in a manner that substantially fills the cavity 28 between the first and second members 15, 20. As shown in FIGS. 3A and 3B, the gasket 50 can have a curvilinear profile shape that changes as the second member 20 slides above the first member 15. The curvilinear profile has an uppermost forward fold region 55 and two opposing leg portions 56, 57, respectively. The length of the leg portions 56, 57 changes from the open to the closed configuration such that the lower leg portion increases from the closed to open configuration and the location of the fold region 55 moves upward relative to the lower member 15 in the direction that the second member 20 slides.

In other wireless terminal configurations, the fold region 55 may be in different locations, such as, for example, closer to the lower portion of the device and may move downward. In addition, rather than the second member 20 sliding on the first member 15, the first member 15 may slidably mount to the second member 20 or each may slide relative to each other (not shown), with the gasket configuration altered as appropriate.

Figure 4:
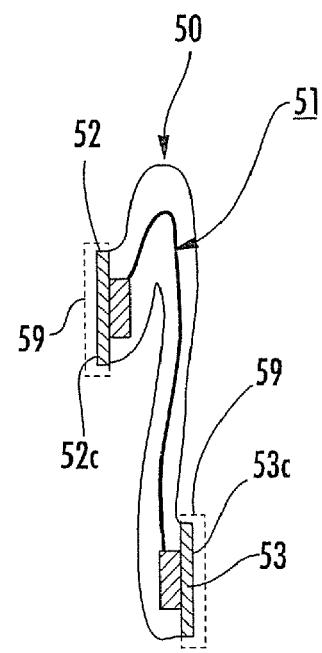
FIG. 4 is a side view of a gasket according to embodiments of the present invention.

FIG. 4 illustrates the gasket 50 shown in FIGS. 3A and 3B. The gasket 50 includes at least one electrical path 51 that extends between end portions of the gasket 52, 53, respectively. The electrical path 51 comprises metal traces that can be inked, painted, spray deposited, molded or otherwise formed on or into the gasket material. The electrical path 51 can be formed on a flex film circuit that is then attached to the gasket 50 as a carrier substrate. The gasket 50 can have any appropriate shape and thickness, and may optionally be the same or thicker than conventional flex film circuits. For example, for a tubular gasket 50 an exemplary thickness range is between about 0.2 mm to about 0.6 mm and end portions may be thicker and/or include laminated or other structures with sufficient rigidity to hold a desired shape. The electrical path 51 can include a plurality of electrical discrete paths that merge into respective electrical connections 52c, 53c that engage with electronic circuits in the first and second members 15, 20, respectively.

The end portions of the gaskets 52, 53 can be configured to fixedly attach to one of the respective first and second members 15, 20 and remain fixed in location irrespective of movement of the members 15, 20. In operation the length of the primary body of the gasket between the end portions allows the sliding translation by changing configurations as the members 15, 20 translate with respect to each other. The attachment may be by a connector matably attachable to the respective member 15, 20. Alternatively, the end portions 52, 53 of the gasket 50 can be screwed, pinned, snapped or adhesively attached to the respective member 15, 20. For the adhesive attachment, an optional peel-off removable protectant film 59 (FIG. 4) can be applied to the gasket 50 during shipment, then removed prior to use or during manufacture of the wireless terminal product.

As shown in FIGS. 5A-5B, the gasket 50 can be tubular with a shape 50a, 50b, 50c, that fits the target gap space to be covered and/or sealed. In the tubular embodiment, the interior of the gasket 50 may be open and the flex circuit may reside on an interior surface or an exterior surface or even buried a depth into one or more of the sidewalls of the gasket 50. The length of the gasket 50 can be between about 35-40 mm long, but can vary depending on the stroke length of the sliding member(s). The gap space that the gasket 50 will cover can have an area of about 35×40 mm (width×length).

Figure 5D:
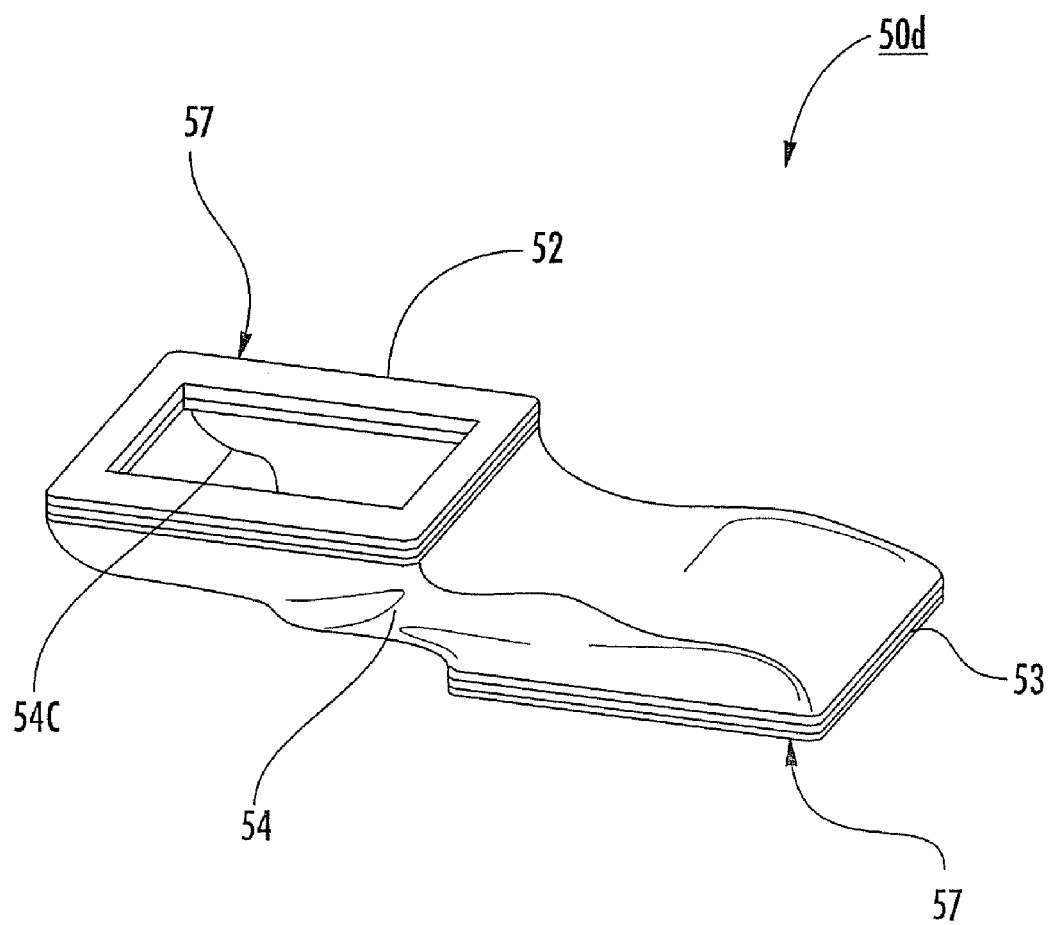
FIG. 5D is a side perspective view of a tubular gasket according to embodiments of the present invention.

FIG. 5D illustrates one example of a tubular gasket 50d with end portions 52, 53 having increased rigidity over the flexible intermediate body 54 for mechanical attachment to the respective first or second members 15, 20. As shown the end portions 52, 53, may define a frame with an open cavity 54c. The electrical path 51 can be placed on an interior or exterior portion of the gasket 50d. As noted above the end portions may include adhesive 57 to attach to the respective member 15, 20, or may otherwise be affixed to the member.

FIGS. 6A-6C illustrate another embodiment of a gasket 50'. In this embodiment, the gasket 50' can function similar to a zipper (or ZIPLOC, see FIG. 9A) to seal the target gap space between the members 15, 20. FIGS. 6B and 6C illustrates that a length of the flexible gasket 50' can travel through an aperture 16 in the first member 15. In operation, the body of the gasket 50' snugly threads through the aperture 16 and both locks the aperture 16 closed when open and unlocks the aperture 16 while moving back and forth. The gasket 50' can include electrical connectors 52c, 53c that engage the electrical circuits in members 15, 20, respectively. The gasket 50' may be configured to cover the entire open gap space between the two members 15, 20, when the wireless terminal 10 is opened, which can be between about 40×60 mm (width by length).

Figure 7A:
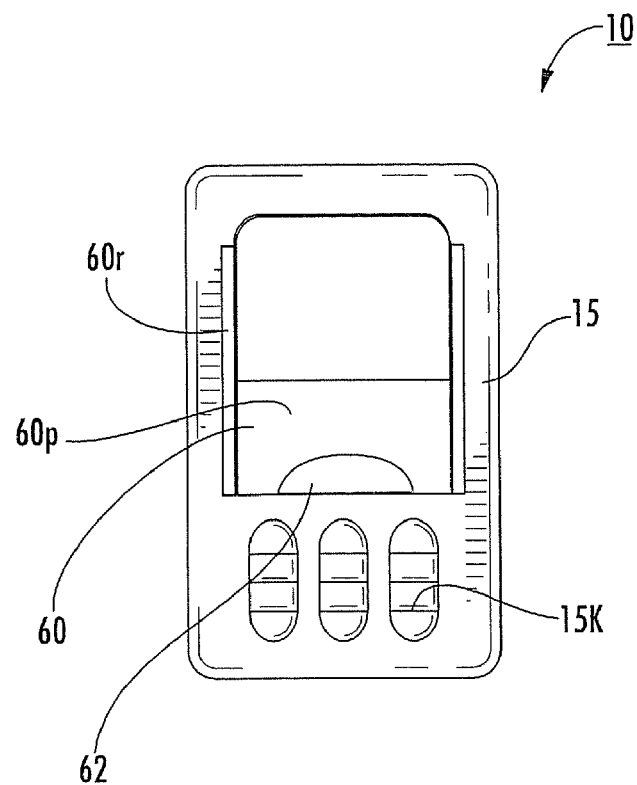
FIG. 7A is a schematic top view of a lower member with a sliding mechanism in a closed configuration according to some embodiments of the present invention.
Figure 7B:
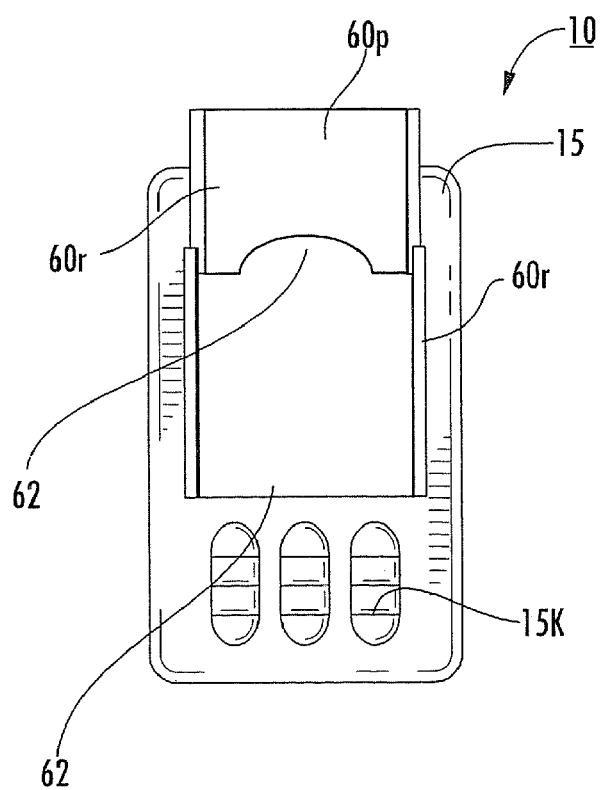
FIG. 7B is a schematic top view of the lower member shown in FIG. 7A with the sliding mechanism in an open configuration according to embodiments of the present invention.

FIGS. 7A and 7B illustrate a sliding mechanism 60 that can be used to slide the second member 20 over the first member 15. The sliding mechanism 60 can include a plate 60p that slides along rails 60r. The plate 60p can have a perimeter portion 62 with a contour configured to matably abut (shown as the gasket 50' when closed (FIG. 8A).

FIGS. 8A-8B illustrate that the gasket 50' can be attached to the sliding mechanism 60 via at least one attachment member 66 so that a portion of the gasket 50' moves directly back and forth with the sliding plate 60p. Alternatively, the gasket 50' can be attached only to the second member 20 to move in response to movement of the second member 20 indirectly in response to movement of the plate 60p. FIG. 8C illustrates that the upper member 20 can include a channel 22 that is configured to receive the connector 53c. The connector may extend into the channel 22 or adhesively attach to the rear (underside) of the member 20.

The attachment of the end portions 52, 53 may be by a connector matably attachable to the respective member 15, 20. Alternatively, the end portions 52, 53 of the gasket 50' can be screwed, pinned, snapped or adhesively attached to the respective member 15, 20. As described above, for the adhesive attachment, an optional peel-off removable protectant film 59 (FIG. 4) can be applied to the gasket 50 during shipment, then removed prior to use or during manufacture of the wireless terminal product.

Figure 9A:
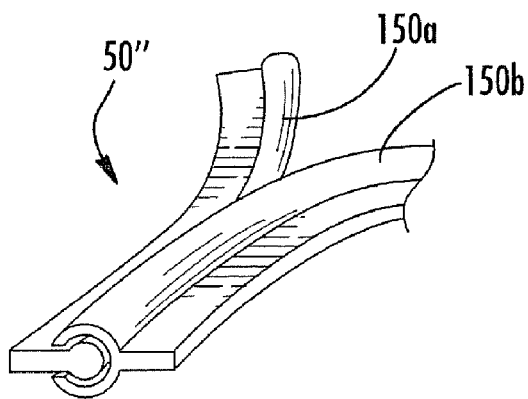
FIG. 9A is a schematic side perspective view of a releasably lockable configuration of a gasket according to embodiments of the present invention.
Figure 9B:
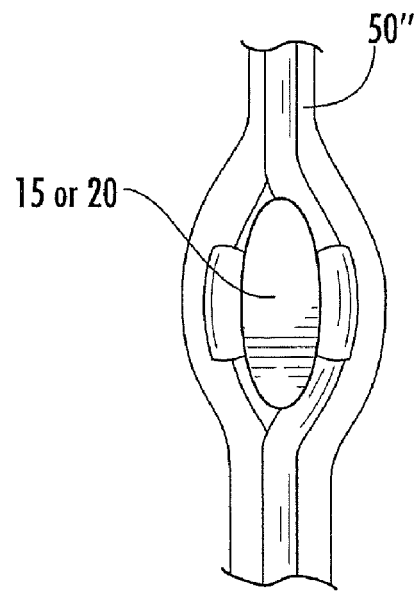
FIG. 9B is a front schematic view of the configuration shown in FIG. 9A.

FIGS. 9A and 9B illustrate another matable releaseably lockable gasket configuration 50". The gasket 50" has long edges 150a, 150b that release, then mate together to seal a target space in the member 15 or 20 in response to sliding of the member 20.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A wireless terminal, comprising:
    a first member;
    a second member overlying the first member, wherein at least one of the first and second members is configured to slide between open and closed configurations; and
    a gasket attached to the first and second members, the gasket having an elongate body portion with opposing first and second end portions affixed to a respective one of the first and second members, wherein the gasket is configured to provide an electrical path between at least one component in the first member to at least one component in the second member, and wherein the elongate body portion is configured to snugly abut the first and second members to inhibit dust from entering a target interior space when the wireless terminal is in the open configuration.

2. A wireless terminal according to claim 1, wherein the gasket has a curvilinear side profile shape in the open and closed configurations, the curvilinear profile having first and second axially extending leg portions on opposing sides of a fold region, the fold region residing at a forwardmost location of the gasket in a opening sliding direction of the second housing member, wherein the first leg portion is closer to the first housing member than the second leg portion and the second leg portion is closer to the second housing member than the first leg portion, and wherein the second leg portion is longer than the first leg portion in the open position.

3. A wireless terminal according to claim 1, wherein the first and second leg portions have a length that is substantially the same in the closed configuration.

4. A wireless terminal according to claim 1, wherein the gasket comprises a flexible non-conductive substrate with a flexible circuit thereon or therein.

5. A wireless terminal according to claim 1, wherein the gasket comprises an elastically stretchable substrate.

6. A wireless terminal according to claim 1, wherein the gasket is tubular and compressible.

7. A wireless terminal according to claim 1, wherein the first member has a keypad and a power source in communication with a transceiver that transmits and receives wireless communications signals, and wherein the second member has a display overlying and slidably attached to the first member, the second member configured to slide between open and closed configurations, wherein in the closed configuration the first and second members are configured so that the second member substantially covers the keypad on the first member, and wherein in the open configuration the second member resides above and axially above a top portion of the first member to reveal the keypad on the first member.

8. A wireless terminal product according to claim 1, wherein the wireless terminal product comprises a wireless mobile telephone.

9. A wireless terminal according to claim 1, wherein the gasket has first and second opposing end portions, and wherein the first end portion is statically affixed to the first member and the second end portion is statically affixed to the second member.

10. A wireless terminal according to claim 1, wherein the gasket is configured to matably releasably lock against walls of a channel in the first member.

11. A wireless terminal according to claim 10, wherein the gasket comprises a sliding lock or zipper attachment mechanism.

12. A wireless terminal according to claim 1, further comprising a sliding plate mounted to the first member, the plate having a contoured perimeter portion for closing against a perimeter shape of the gasket.

13. A wireless terminal according to claim 12, wherein the gasket is attached to the sliding plate and is pulled back and forth in response to movement of the sliding plate.

14. A wireless terminal according to claim 12, wherein the gasket has first and second electrical connection end portions, and wherein the second electrical connection end portion is configured to engage a laterally extending channel formed through a rear surface of the second member.

15. A flexible elongate gasket for a wireless terminal, the gasket having electrical connections on spaced apart opposing first and second end portions, the gasket defining an electrical path therebetween, wherein the flexible elongate gasket is configured to reside in abutting contact against first and second members, at least one of which is slidable relative to the other and is sized and configured to occupy a target gap space between the first and second members to form a seal that inhibits dust from entering the gap space.

16. A gasket according to claim 15, wherein the gasket is tubular, and wherein the gasket has a first folded configuration in the open configuration and a second folded configuration different from the first configuration in the closed configuration.

17. A gasket according to claim 15, wherein the gasket is configured to matably releasably lock against a rigid member.

18. A gasket according to claim 17, wherein the gasket has a sliding lock or zipper attachment mechanism.

19. A method for inhibiting dust from entering a housing compartment in a mobile telephone with at least a sliding member, comprising:
    sliding a second member over a first member to open a mobile telephone;
    automatically translating a gasket defining an electrical path between a battery in the first member to a display in the second member in response to the sliding step; and
    inhibiting dust from entering the mobile telephone in response to the translating step.

20. A method according to claim 19, further comprising:
    affixing a first end portion of the gasket to the first member and a second opposing end portion of the gasket to the second member so that the first and second end portions are held securely and statically in position; and
    threading a portion of the gasket through an aperture in the second member whereby the gasket substantially seals the opening and serial portions of the gasket travel through the opening to translate axially during the translating step.

* * * * *